(12) United States Patent
Liu et al.

(10) Patent No.: US 10,049,692 B1
(45) Date of Patent: Aug. 14, 2018

(54) CLOSED-LOOP FLY HEIGHT CONTROL USING SECTOR-SPECIFIC, REPEATABLE VGA VALUES

(71) Applicant: Seagate Technology LLC, Cupertino, CA (US)

(72) Inventors: Xiong Liu, Singapore (SG); Lihong Zhang, Singapore (SG); KianKeong Ooi, Singapore (SG); Xiang Lu, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 289 days.

(21) Appl. No.: 14/925,126

(22) Filed: Oct. 28, 2015

(51) Int. Cl.
G11B 21/02 (2006.01)
G11B 5/60 (2006.01)
G11B 5/31 (2006.01)
G11B 5/58 (2006.01)

(52) U.S. Cl.
CPC ............ G11B 5/607 (2013.01); G11B 5/3133 (2013.01); G11B 5/582 (2013.01)

(58) Field of Classification Search
None
See application file for complete search history.

(56) References Cited

U.S. PATENT DOCUMENTS

| | | | |
|---|---|---|---|
| 6,522,493 B1* | 2/2003 | Dobbek | G11B 5/59627 360/75 |
| 7,253,984 B1* | 8/2007 | Patapoutian | G11B 5/59688 360/75 |
| 7,298,566 B2* | 11/2007 | Ueda | G11B 21/21 360/31 |
| 7,457,067 B2 | 11/2008 | Yoshioka et al. | |
| 7,508,617 B1 | 3/2009 | Mak et al. | |
| 7,738,211 B2 | 6/2010 | Oyamada et al. | |
| 7,916,420 B1 | 3/2011 | McFadyen et al. | |
| 7,969,682 B2* | 6/2011 | Takahashi | G11B 5/6005 360/55 |
| 8,059,357 B1* | 11/2011 | Knigge | G11B 5/6011 360/75 |
| 8,730,610 B2 | 5/2014 | McFadyen et al. | |

\* cited by examiner

*Primary Examiner* — K. Wong
(74) *Attorney, Agent, or Firm* — Hollingsworth Davis, LLC

(57) ABSTRACT

Gain values used by a variable gain amplifier (VGA) to read servo marks of a heat-assisted recording medium are measured. Sector-specific, repeatable gain values that indicate an expected VGA gain at a desired clearance are determined based on the measured gain values. The sector-specific, repeatable gain values are used as input to a closed-loop clearance controller together with measured values of servo VGA gain while writing data to the recording medium.

20 Claims, 7 Drawing Sheets

CLOSED-LOOP FLY HEIGHT CONTROL USING SECTOR-SPECIFIC, REPEATABLE VGA VALUES

SUMMARY

The present disclosure is directed to a method, system, and apparatus configured for closed-loop fly height control. In one embodiment, gain values used by a variable gain amplifier (VGA) to read servo marks of a heat-assisted recording medium are measured. Sector-specific, repeatable gain values that indicate an expected VGA gain at a desired clearance are determined based on the measured gain values. The sector-specific, repeatable gain values are used as input to a closed-loop clearance controller together with measured values of servo VGA gain while writing data to the recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to devices that use heat-assisted magnetic recording (HAMR). This technology, also referred to as energy-assisted magnetic recording (EAMR), thermally-assisted magnetic recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

In order to heat the recording medium, a HAMR read/write head includes a source of energy (e.g., a laser diode) and an optical pathway that delivers the energy to a small spot on the medium. This optical pathway can experience significant local changes in temperature due to this energy, and this can complicate other operations of the read/write head that depend on temperature. For example, the clearance between the read/write transducers and the recording medium may be actively controlled by the use of an electrically controlled heater that causes local thermal expansion near the read/write transducers.

The present disclosure relates to control of head-to-media clearance (also referred to as dynamic fly-height herein) in a HAMR device or similar environment where additional heat sources in the read/write head can cause difficulties in setting clearance. Conventional disk drives (e.g., perpendicular magnetic recording devices) may use an open loop controller to control head-disc clearance. This generally involves determining a clearance as a function of heater input (e.g., during certification testing), and then applying the desired current to achieve the desired clearance during operation. This can work reasonably well in conventional hard disk drives since the head-disk clearance is dominantly controlled by the built-in heater(s).

For HAMR application, the head-disk clearance is affected by more factors than those affecting the clearance of conventional HDDs. Additional factors which affect HAMR clearance include the laser power, time of continuous writing, disk surface protrusion under laser heat, physical profile change of the slider body, trailing edge cap under laser heat, etc. In view of this, a closed-loop controller methodology is proposed in this disclosure, which can provide precise control of the head-disk clearance for HAMR applications.

Figure 1:
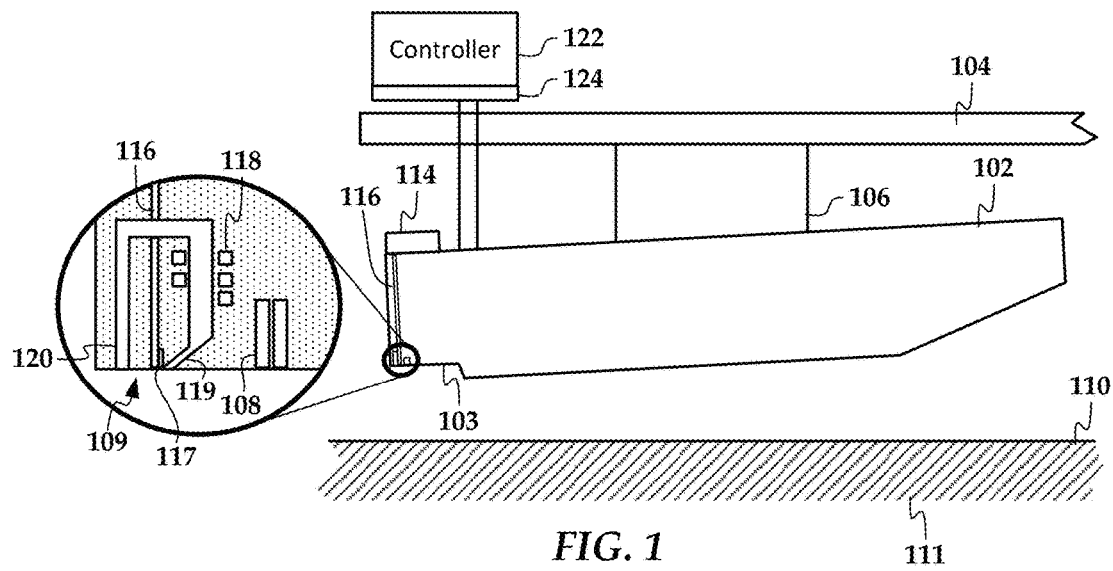
FIGS. 1 and 2 are block diagrams of a hard drive slider and media arrangement according to an example embodiment.
Figure 2:
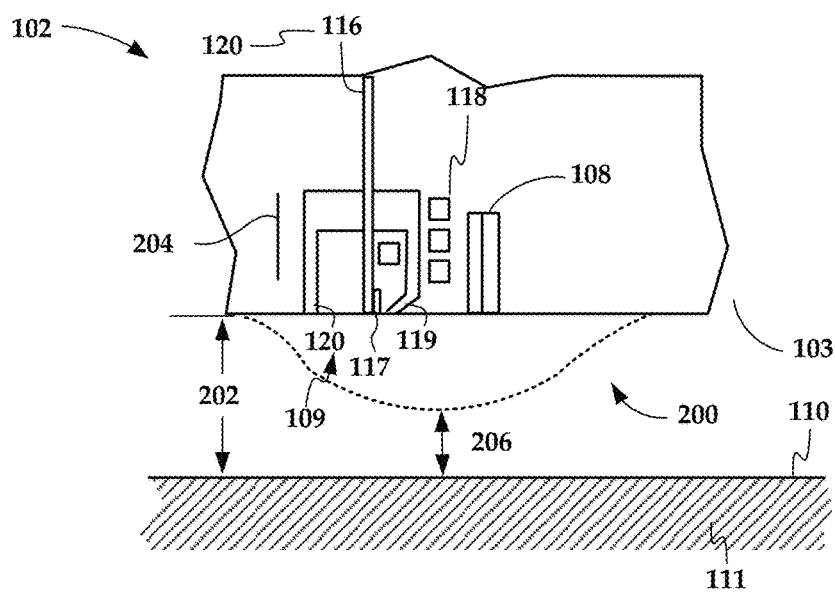

In order to better understand the types of devices utilizing the disclosed closed-loop controller, a HAMR read/write head slider 102 according to an example embodiment is shown in the diagrams of FIGS. 1 and 2. The read/write head slider 102 may be used in a HAMR data storage device, e.g., HAMR hard disk drive (HDD). The read/write head slider 102 may also be referred to herein as a slider, read head slider, recording head slider, write head slider, etc. As seen in FIG. 1, the read/write head slider 102 is coupled to an arm 104 by way of a suspension 106. The read/write head slider 102 includes at least one read transducer 108 and at least one write transducer 109 at a media-facing surface 103. The transducers 108, 109 are held proximate to a surface 110 of a magnetic recording medium 111, e.g., magnetic disk.

The read/write head slider 102 includes a laser 114 coupled to an optical path 116 integrated into the read/write head slider 102. The optical path 116 delivers energy to a near-field transducer 117 that is part of the write transducer 109. The near-field transducer 117 achieves surface plasmon resonance in response to the optical energy, and directs the surface plasmons to heat a surface of the recording medium 111 when recording data. The write transducer 109 also includes a write coil 118, write pole 119, and return pole 120. While the recording medium 111 is being heated, the write coil 118 is energized to create a magnetic field that is directed to the recording medium via a respective write pole 119 and return pole 120.

A controller 122 includes logic circuits that control current supplied to the laser 114, as well as sending and receiving of signals to and from the recording head. Those signals include read and write channel data, adaptive fly height control signals, etc. An interface 124 conditions the signals between the controller 120 and the read/write head, performing pre-amplification, filtering, analog-to-digital conversion, digital-to-analog conversion, encoding, decoding, etc.

In FIG. 2, a block diagram shows additional details of the slider 102 near region 200, which is a "close point" of the slider 102. The close point region 200 is generally understood to be the closest point of contact between the slider 102 and the magnetic recording medium 111. To account for both static and dynamic variations that may affect slider flying height 202, the slider 102 may be configured such that a protrusion of the close point region 200 can be configurably adjusted during operation to affect a dynamic fly height 206 during reading and/or writing. This is shown in FIG. 2 by dotted line that represents a change in geometry of the region 200.

In this example, the geometry change may be induced, in whole or in part, by an increase or decrease in temperature of the region 200. Changes in temperature causes a deformation in this area 200 due to thermal expansion of the surrounding materials. Thus, selective application of heat to the slider 102 proximate the transducers 108 and 109 can be used to finely adjust the fly height of the transducers 108, 109 during reading and writing. This is referred to as dynamic fly height 206, and is measured between the transducers 108, 109 and media surface 110. There may be two dynamic fly heights 206, e.g., one for the reader 108 and one for the writer 109, and these may be independently adjustable for respective reading and writing operations.

To provide this type of control over head-media spacing 206, the slider 102 may include (or otherwise be thermally coupled to) one more heating elements 204. This heating element 204 (e.g., a resistance heater) may be provided with selectable amounts of current to control the dynamic fly height 206 through heat-induced expansion of the physical structure. Other elements of the slider 102 may also provide heat besides or in addition to the heating element. For example, a write coil 118 of the write transducer 109 may generate sufficient heat to cause configurable deformation of region 200. This is sometimes referred to as "writer protrusion" or "write-current-induced protrusion" and may need to be accounted for when the write coil is active, e.g., when writing is occurring. Also the near-field transducer 117 may experience local heating when illuminated by the laser, resulting in what is known as "laser-induced protrusion."

Figure 3:
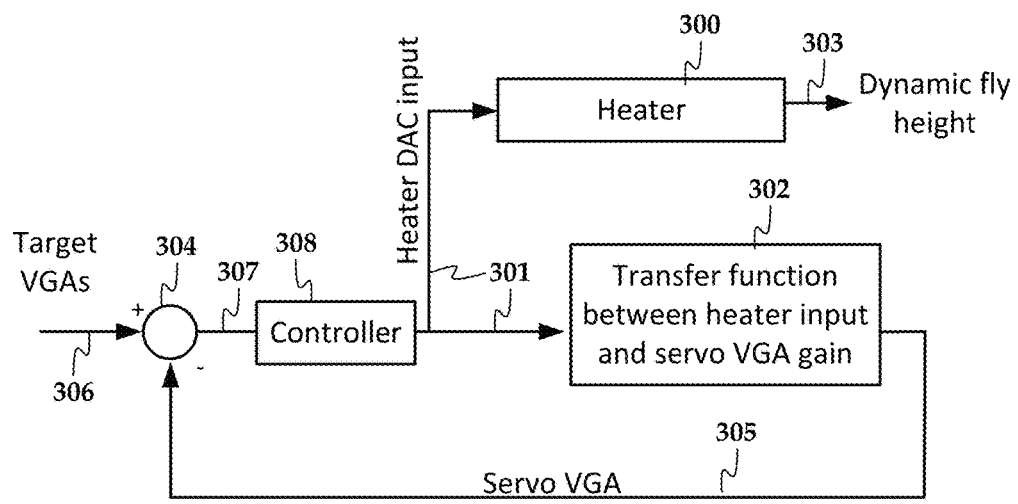
FIG. 3 is a control diagram of closed-loop fly-height controller according to an example embodiment.

Both write-current induced transducer protrusion and laser-induced protrusion can combine with protrusion induced by the heating element 204, and also cause other geometry changes to the recording head 102 and medium 111. Therefore, a closed loop controller is proposed to regulate power supplied to the heating element 204. In FIG. 3, a block diagram illustrates a high-level diagram of a control loop according to an example embodiment. A clearance-control heater 300 receives an input 301 via a digital-to-analog converter (DAC) that varies an amount of power applied to the heater, which results in a change of thermally-induced dynamic fly height 303. The dynamic fly height 303 affects the signal strength of data read from the recording medium. In this case, the data of interest include servo marks that are pre-written on the recording medium as part of the manufacturing process. Generally, the servo marks facilitate locating where (e.g., which track and sector of the disk) the read/write heads are located. The servo marks are not intentionally modified during operation of the disk drive, and so will generally be read back at a known signal strength for a given clearance. As a result, changes to signal strength during servo read-back may be assumed to be due, at least in significant part, to changes in dynamic fly height.

The servo marks are read via a read transducer of a read/write head during read and write operations of the read/write head. A preamplifier section conditions the analog signal received from the read transducer. A read channel receives the conditioned analog signal and decodes digital servo data from the signal. Part of the conditioning performed by the preamplifier section involves amplifying the analog signal to a predetermined level by a variable gain amplifier (VGA), which facilitates accurate decoding the data via the decoder. The amount of gain provided by the VGA is inversely proportional to the signal strength of the read transducer signal.

As indicated by block 302, a transfer function between the heater DAC input 301 and the servo VGA gain 305 can be used as a controller plant to provide feedback to control the dynamic fly height 303. As indicated by input 306 to summation block 304, an adjustment to the feedback loop is used to compensate for magnitude variation of the servo signal due to different read head characteristics, differences in the written servo marks, track radius, etc. The variations can be calibrated during a certification process and can be removed from feedback signal as indicated by the summation block 304. This correction input 306 removes known factors affecting the VGA gain thereby isolates changes in measured VGA gain 305 to those primarily due to changes in transducer fly-height. A controller 308 uses an inverse of the transfer function to map the VGA difference signal 307 to heater DAC inputs 301.

Figure 4:
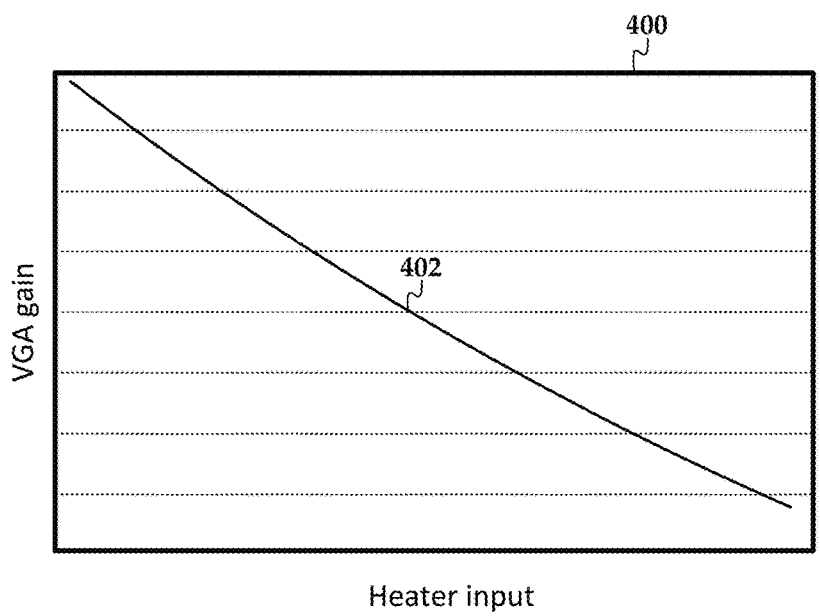
FIG. 4 is a graph showing a relationship between heater input at servo read amplifier gain according to an example embodiment.

In FIG. 4, a graph 400 shows an example of a function that can be used in the control loop of FIG. 3. The curve 402 shows that amount of VGA gain decreases with increasing heater DAC input values. This is because increasing heater power decreases the spacing between the read transducer and the recording medium, resulting in higher signal levels detected by the read transducers. These higher signal levels result in lower amounts of gain required by the VGA. In this example, the curve 402 can be accurately estimated using a second-order, polynomial curve fit.

The curve 402 can be used by a control loop to maintain a constant dynamic fly height for the read and write transducers. For example, for a given servo mark, the heater DAC can be increased or decreased until a target VGA gain is achieved, which corresponds to a target dynamic fly height. The VGA gain for a given dynamic fly height may vary significantly between individual servo marks. Even though the servo marks may be written under controlled conditions, there are a number of variables (e.g., imperfections in the recording medium, skew of the read head) that cause them to be read back at different levels at a the same dynamic fly height. Accordingly, there may be a need to determine a target VGA for each servo mark (e.g., each track and sector), the target VGA corresponding to a target fly height.

Figure 5:
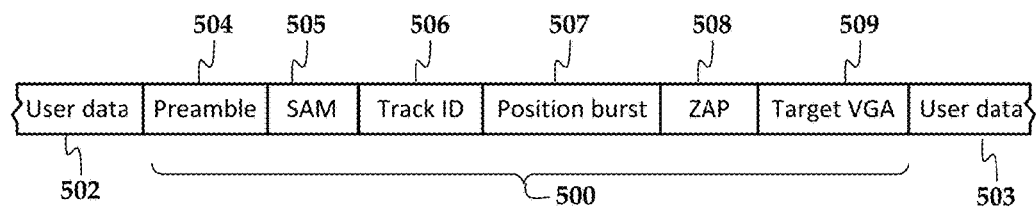
FIGS. 5 and 6 are block diagrams of servo marks according to example embodiments.

One way of determining target VGA gain values is to collect values at a target clearance during certification testing, then store the values in each of the servo marks (also referred to as servo wedges). An example of this is shown in FIG. 5, which is a block diagram of a servo mark 500 according to an example embodiment. The servo mark 500 is located on a track between data sectors 502, 503 that store user data. The servo mark includes preamble and servo address mark (SAM) fields 504, 505 that facilitate locating the start of servo data and provide a servo timing reference. A track ID field identifies the position of the servo mark 506, e.g., which physical track and sector in which the mark 506 is located.

A position burst field 507 contains a number of bursts (e.g., constant tone fields) that are offset in a cross track direction from one another, and allow the read/write head to determine a position offset from track center. A repeatable runout field 508 (also referred to as zero-acceleration path, or ZAP) includes data that allows the servo-tracking system to compensate for runout of the servo marks. Even though the servo marks may be written in a precisely-controlled factory process, there may be enough variance in location of the marks in the assembled drive that the physical tracks defined by the servo marks are off-center. The repeatable runout field 508 includes offset data that is used to correct these variances.

The servo mark 500 may also be configured to use a target VGA field 509 that stores the sector-specific target VGA gain used for closed-loop control of dynamic fly-height. The target VGA gain is read from the field 509, and used as an input to a control loop, e.g., input 306 in FIG. 3. The value stored in the field 509 may be track and/or sector specific. For example, in some embodiments, a subset of the servo marks in a track may contain a track-specific target VGA field, and sector specific target VGAs may be derived using this value (e.g., using curve fits as described below). It will be understood that the illustrated servo mark 500 is provided for purposes of example, and the field 509 may be included in servo marks with different fields and/or different ordering of fields.

Figure 6:
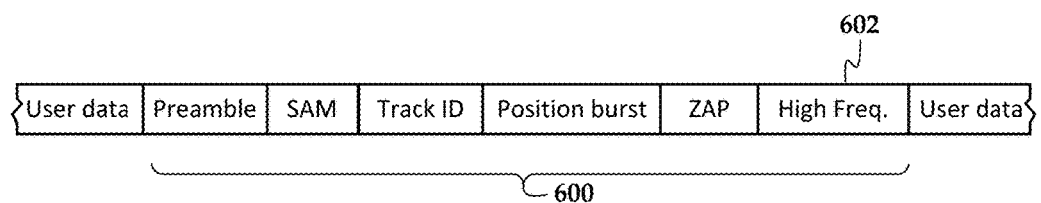

In FIG. 6, a block diagram shows a servo mark 600 according to another example embodiment. The servo mark 600 is similar to servo mark 500 in FIG. 5, except that a high frequency field 602 is used in place of a target VGA field 509. It will be understood both high frequency field 602 and target VGA field 509 may be used either in the same servo mark or on in different servo marks on the same recording medium. The high frequency field 602 facilitates the use of a harmonic sensor to determine fly height. A harmonic sensor reads the high frequency field 602 and combines it with a similar reading from the current servo signal (e.g., preamble field, position burst fields) to determine dynamic fly height. The harmonic sensor output determines dynamic fly height using the Wallace equation, which states that the change in amplitude of the measured signal harmonies directly relate to the flying height change of the read/write head/transducer. Both dual harmonic sensor and single harmonic sensor can be used after calibration of the read/write head in certification testing.

The embodiments shown in FIGS. 5 and 6 may be used separately or together on the same device. Not every servo mark on the recording medium needs to include the target VGA file 509 and/or high frequency field 602. For example, just the even or odd servo marks may contain one of these both of these fields. The clearance change response to heater inputs is relatively slow compared to the traversal time between sector marks, so a further spacing could be used, e.g., every other odd mark, every other even mark, etc.

Figure 7:
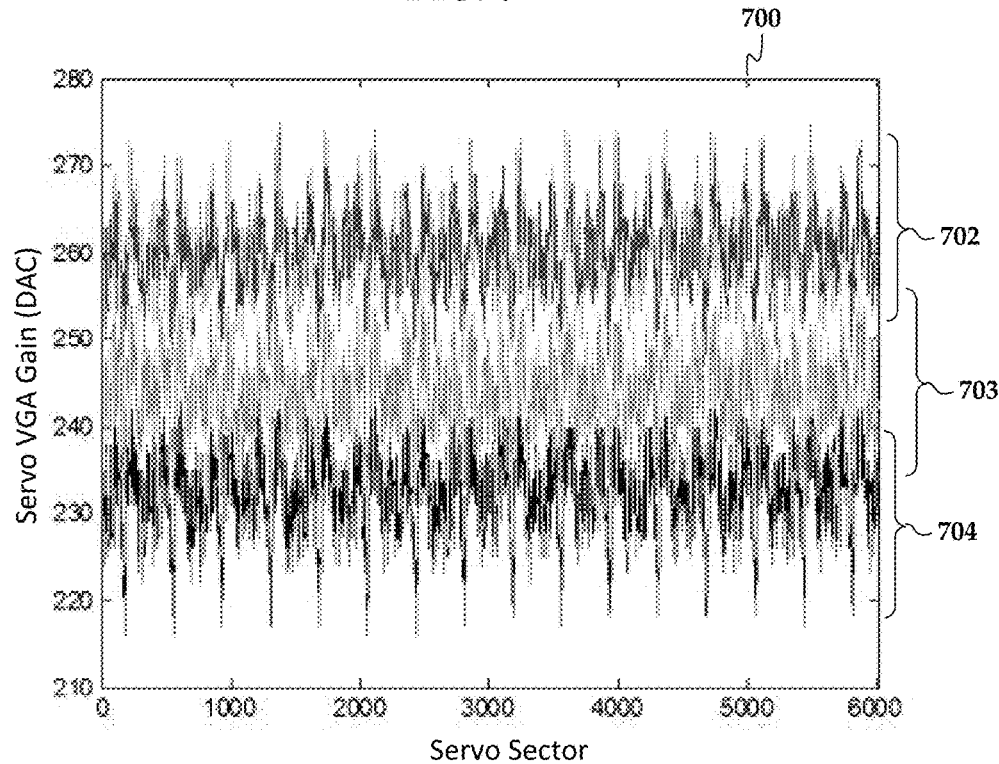
FIGS. 7-9 are graphs of servo amplifier gain over a range of sectors according to example embodiments.

While storing target VGAs in servo marks allows for fine-granularity determination of VGA values, the increase in the size of a large number of servo marks to accommodate new fields will tend to reduce the amount of storage area on the recording medium available for storage of user data. Another way to determine target VGA gains for a closed-loop controller is to use curve-fitting to estimate a transfer function between target VGA and track radius (and/or sector). These curves can be used to derive VGA target compensation values to minimize sector-to-sector variation. In FIG. 7, a graph 700 illustrates an example of location-dependent servo VGA gain values according to an example embodiment. Differently shaded traces 702-704 represent VGA gain as a function of servo sector for three tracks. The VGA gain is expressed as an input value to a 9-bit DAC, which can range from 0 to 511.

Figure 8:
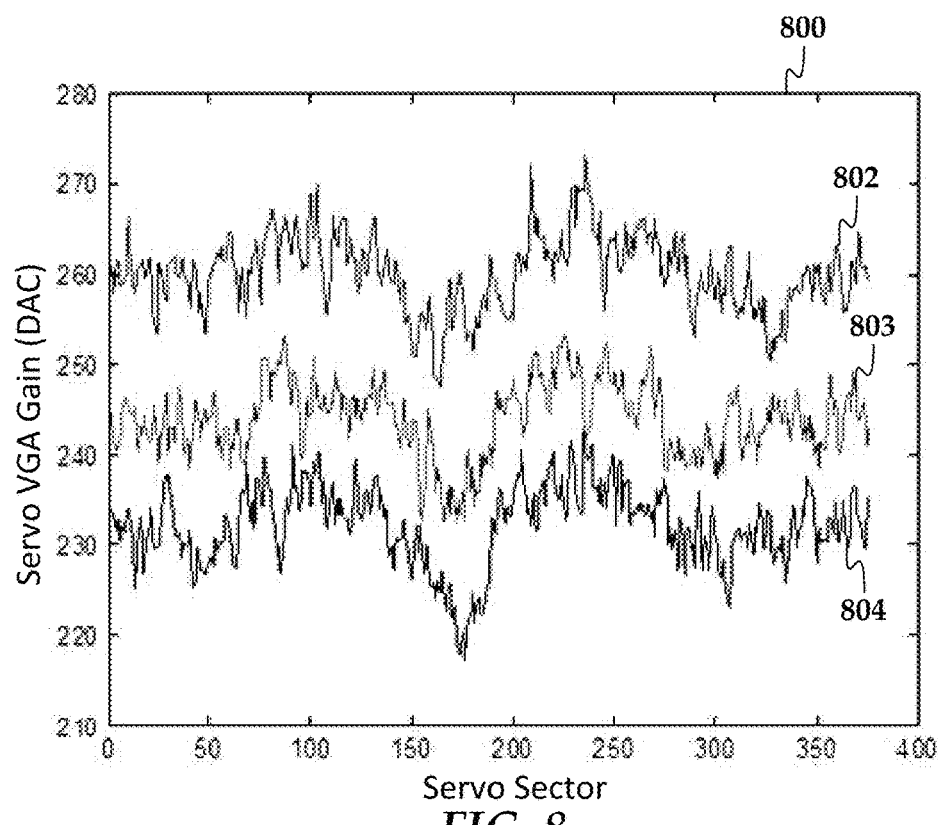
Figure 9:
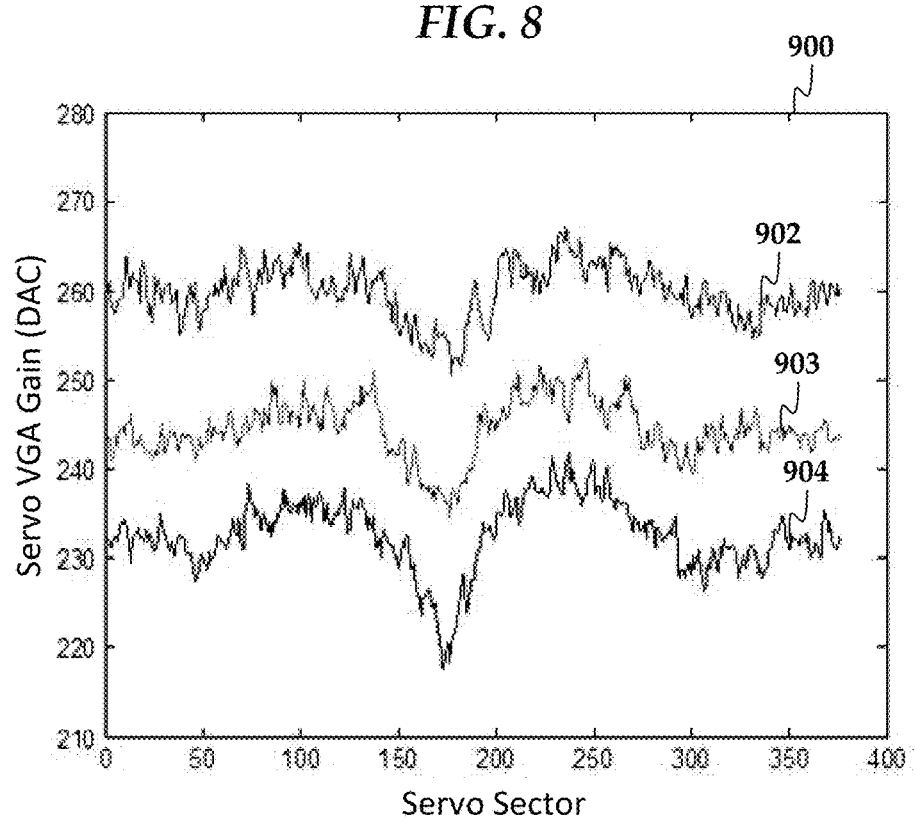

The VGA traces 702-704 in FIG. 7 can be divided into three components: non-repeatable VGAs (NRVGA), coherent repeatable VGAs (CRVGA), and incoherent repeatable VGAS (ICRVGA). The NRVGA component changes randomly revolution-by-revolution at a given servo sector. The CRVGA is a repeatable gain as a function of radial angle, and is similar track-by-track at a given servo sector, although there may be a constant offset for all sectors of each track. The ICRVGA is repeatable revolution-by-revolution at a given servo sector, but will change from track-to-track. In FIG. 8, a graph 800 shows the combination of CRVGA and ICRVGA which is a subset of the sectors shown in FIG. 7, the subset corresponding to one revolution of the disk. Traces 802-804 correspond to traces 702-704 of FIG. 7. In FIG. 9, a graph 800 shows CRVGA at the same subset of sectors as in FIG. 8, where traces 902-904 correspond to traces 702-704 of FIG. 7. The NRVGA are not shown, but will generally appear as random fluctuations in DAC input values about zero, the DAC values varying over a much smaller range that seen in FIGS. 8 and 9 (e.g., NRVGA is in the range of about −4 to +4 in this example) and will change each time measured.

Both the CRVGAs and ICRVGAs will be constant for a given track and can be measured after completing dynamic fly-height tuning in the drive factory test. As such, the CRVGA+ICRVGA may be estimated via a curve fit or other technique for reproducing a complex shape based on a small number of parameters. In cases where the ICRVGA is significantly smaller than CRVGA, the CRVGA by itself may be estimated and used for VGA feedback control. In the illustrated example, the standard deviation for all VGA measurements over all tracks is about 6.0. The standard deviation of NRVGA for this case is about 1.3, and the standard deviation of NRVGA+ICRVGA is about 2.4. Therefore accounting for CRVGA by itself will compensate for the bulk of the repeatable variance ($\sigma \approx 3.6$).

The CRVGA can be collected and calculated by dividing each surface into zones and reading the servo VGA gain from each head in each zone. A multi-track servo VGA average as shown in Equation [1] below is performed to extract the angle-specific CRVGA for each zone, where n is the number of tracks in the zone. The track CRVGA will be determined based on linear interpretation of CRVGA at zone boundaries, as indicated by Equation [2] below. For Equation [2], $N^j$ and $N^{j+1}$ are track numbers at zone respective boundaries j and j+1, i is the servo sector number, j is the zone number, and T is the track number of target track.

$$CRVGA = \frac{1}{n}\sum_{i=1}^{n} VGA^i \quad [1]$$

$$CRVGA_i^T = CRVGA_i^j + \frac{CRVGA_i^{j+1} + CRVGA_i^j}{N^{j+1} - N^j}(T - N^j) \quad [2]$$

The CRVGA values for all head/zone combinations are stored in a table on the system tracks. Upon spin-up of the hard drive, the values in the table can be stored in RAM and used by a closed-loop controller to select a target VGA gain for each sector. This target VGA gain is used at least during writing, although may be used during reading as well. In other embodiments, read fly-height control may be performed open-loop, e.g., to reduce processing needed for closed-loop control.

Figure 10:
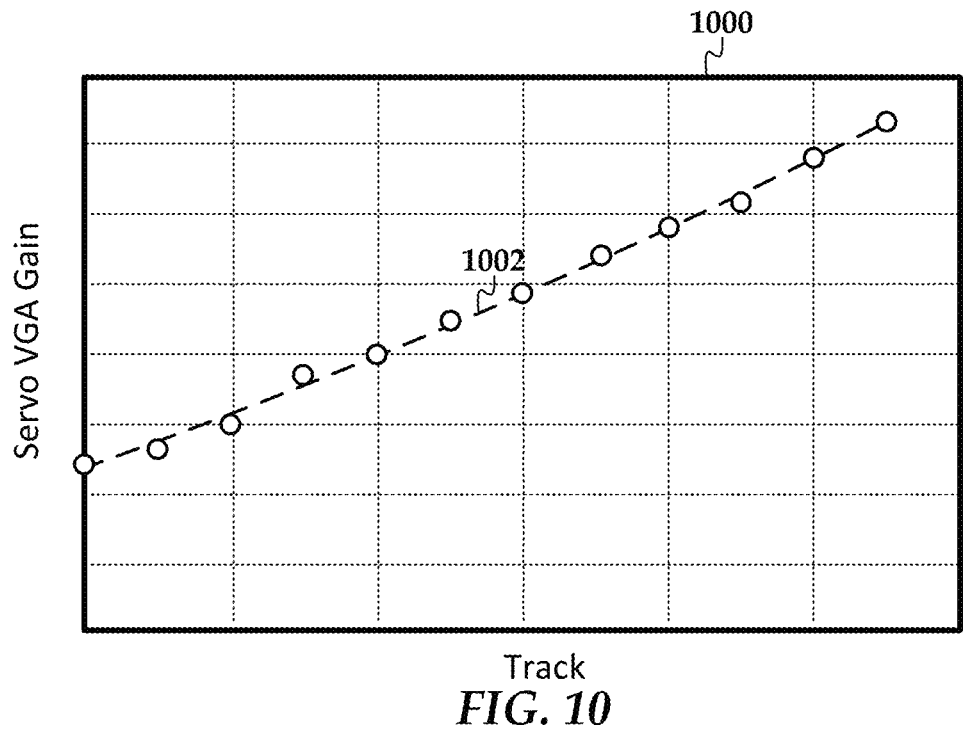
FIGS. 10 and 11 are graphs showing track-specific variation of servo gain values according to example embodiments.

As noted above, the CRVGA for each track may need to be adjusted by a track-specific offset, because VGA also varies by track radius. In FIG. 10, a graph 1000 shows variation of target VGA as a function of track number. The points can be fitted by a second order polynomial, indicated by curve 1002. For each track, a repeatable VGA for each sector may be derived from a curve fit of CRVGA as described above. Then, a track-specific offset can be added to the each value of CRVGA. The track specific offset can be derived from a second curve fit as shown in FIG. 10.

Figure 11:
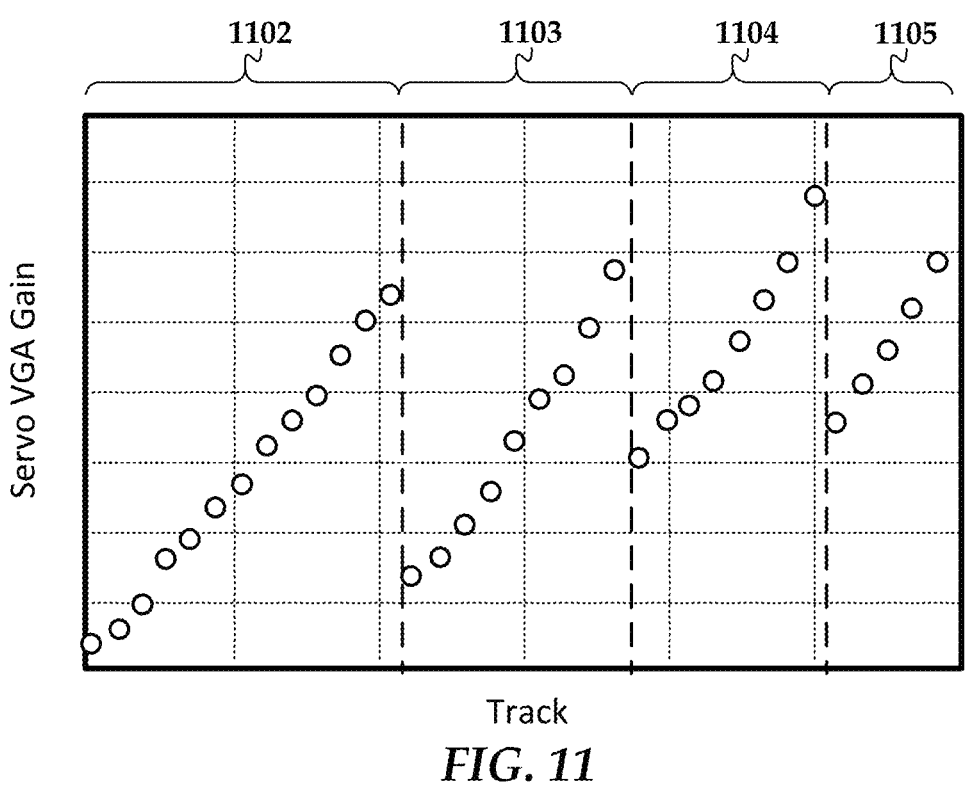

In FIG. 10, the tracks are located within a single radially-defined zone of the disk surface. The surface of a hard disk is commonly divided into a plurality of zones, each zone using a different servo frequency to account for different linear velocities and different radii. Each zone may have different VGA gain characteristics, as shown in the graph of FIG. 11. Four different zones 1102-1105 are shown in this graph, each zone having a different VGA response. Each zone in this example uses a different servo frequency. Because VGA gain also depends on servo frequency, this causes sharp changes at the zone boundaries. Other parameters can change between zones, e.g., slope of VGA as a function of track. In view of this, the track-specific offset described above can further be made zone-specific, being selected from one of a plurality of zone-specific curve fits.

Long, continuous write operations (e.g., writing of sequential data) using a HAMR read/write head can cause the dynamic-fly height to fall below target even without the clearance-control heater activated due to the thermal effects of the laser. Avoidance of head-to-media contact is desired in such a scenario, e.g., contact with the media risks damage to the near-field transducer and other components. The closed-loop controller described above can help to identify this scenario. When the output of digital controller is at or below zero (the clearance becomes less than target even without heater power applied), the write operation can be stopped since the transducer area is overheated by laser power.

Figure 12:
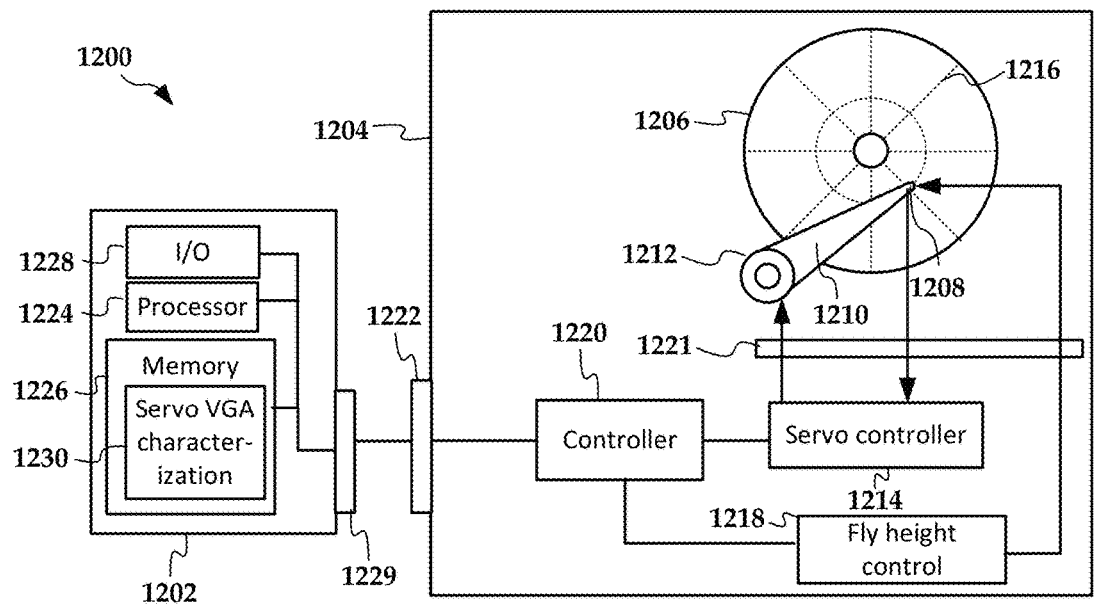
FIG. 12 is a block diagram of a system and apparatus according to an example embodiment.

Generally, the characterization of servo VGA response to clearance change can be performed in qualification testing. After testing, results can be stored on the storage device and applied in use to control a clearance control element of the read write head during operation of the device. In reference now to FIG. 12, a block diagram illustrates components of a testing system 1200 according to an example embodiment. The system 1200 includes an optional testing apparatus 1202 and tested hard disk drive device 1204. The hard drive 1204 includes a magnetic disk 1206 used as a recording media. One or more HAMR read/write heads 1208 are mounted to an arm 1210 that is driven radially via a voice coil motor 1212 and optionally via a microactuator (not shown). A servo controller 1214 reads servo marks 1216 on the disk 1206 via the read/write heads 1208. The servo marks 1216 facilitating locating where (e.g., which track) the read/write heads 1208 are located. The servo marks 1216 may have been written on the disk 1206 before assembly (e.g., via a multi-disk writer) or after assembly (e.g., self-servo write). In either case, the servo marks 1216 will exhibit a predictable signal strength for a given clearance under normal conditions for the life of the device 1204.

A fly-height controller 1218 provides closed-loop control of dynamic fly height for each of the read/write heads 1208 during at least writing. The fly height controller 1218 activates a heater and/or other heat producing devices (e.g., write coil) to induce local protrusion near read transducers and/or write transducers of the read/write heads 1208. The fly height controller 1218 may also access control data stored, e.g., in the servo marks, in system storage space on the disks, etc., that allows the controller to determine/estimate a target VGA for each of the servo marks 1216, the target VGA corresponding to a target fly height. The fly height controller 1218 may also utilize a harmonic sensor that allows directly measuring fly height by relative signal strength of one or more tones recorded on the recording medium, e.g., as part of the servo marks 1216.

A controller 1220 provides high-level control of operations of the hard drive device 1204, including fly height control and servo control. The controller 1220 may facilitate operations of other components not shown, such as read/write channels, disk motor control, power distribution, activation of HAMR lasers, etc. Generally, interface circuitry 1221 facilitates communications between the various controllers and other electrical components (e.g., voice coil motor 1212, read/write heads 1208). Such circuitry 1221 may include, but is not limited to preamplifiers, amplifiers, filters, analog-to-digital converters, digital-to-analog converters, power supplies, encoders, decoders, read/write channels, etc.

The hard drive device 1204 includes a host interface 1222 for communicating with external devices, including the testing apparatus 1202. The testing apparatus 1202 may include conventional computing hardware, such as a processor 1224, memory 1226, and input/output (I/O) circuitry 1228. The tester includes an interface 1229 that may provide electrical and mechanical coupling to the hard drive device 1204. The tester 1202 is at least configured (e.g., via instructions stored in memory 1226) to perform calibration and/or qualification tests on the hard drive device 1204. The instructions include a servo VGA characterization module 1230 that is configured to measure VGA response of the servo marks 1216 as a function of servo location as described herein.

The servo VGA characterization module 1230 may send commands via the hard drive device's host interface 1222 or other I/O interface. These commands cause the hard drive device 1204 to perform optimization during a factory process, e.g., qualification testing. This testing may first involve determining open loop settings for fly height control such that a desired dynamic fly height can be maintained by inputting a particular setting, e.g., a DAC input value that drives a heater. Thereafter, the module 1230 causes the read/write heads to traverse some or all of the servo marks 1216 and record a gain used by a VGA when reading the marks at a desired dynamic fly height. This may be repeated to get an average for each measurement. Additional characterization may be performed, such as repeating the measurement for at least some servo marks at clearances above and below the desired dynamic fly height. This allows estimating a control response such as shown in FIG. 4.

Thereafter, the controller 1220 of the hard drive device 1204 may store the VGA gain values in memory (e.g., servo marks, system-reserved storage on the disk, flash memory, etc.) and these may be referenced (e.g., via the fly-height controller 1218) during reading and writing operations of the device 1204. The operational values may be stored as specific VGA targets (e.g., track or sector specific target VGA written together with servo marks) or curve fit parameters that allow the sector-specific VGA targets to be derived.

In will be understood that the above characterization may be performed on the hard drive device 1204 without involvement of the testing apparatus 1202. For example, the instructions of the servo VGA characterization module 1230 used to perform the above-described procedures may be included in the drive's memory 1221, e.g., as part of a firmware image. The characterization procedure may be triggered during the factory process, and the device 1204 may internally read the VGA values and store them. These instructions may be idled, disabled, or erased from the device 1204 before operation, or may be used later during operation of the device 1204. For example, the hard disk device 1204 may be able to periodically re-run the characterization due to detected changes in the read/write heads 1208 that affect, e.g., read transducer sensitivity, protrusion response, etc. This characterization may be used thereafter for improved dynamic fly-height control. Part of this characterization may include determining accurate clearance estimates based on a harmonic sensor during reads. Thereafter, once an open loop estimate of clearance is obtained, the VGA gain of at least a subset of the servo sectors is re-measured. This can be used, e.g., to modify parameters of curve fits used to derive/estimate the target VGAs.

Figure 13:
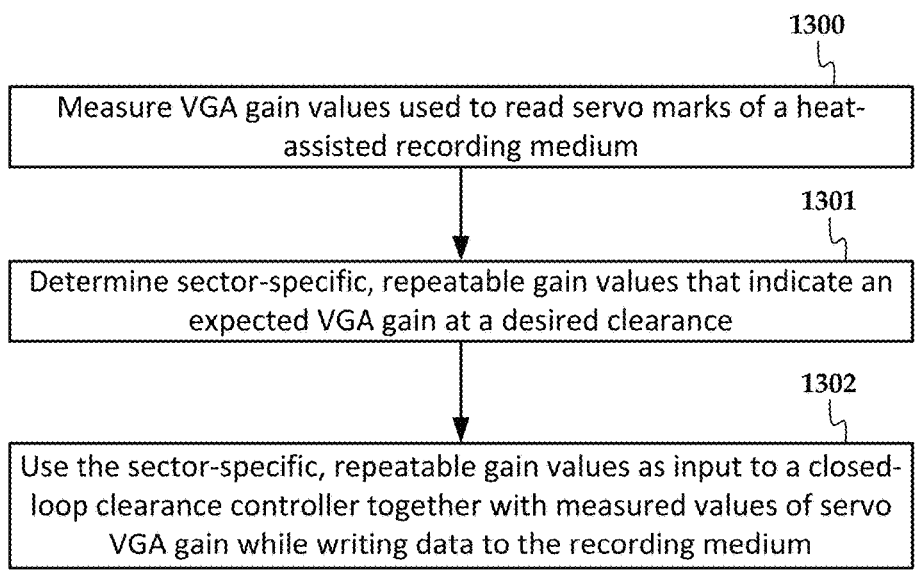
FIG. 13 is a flowchart of a method according to an example embodiment.

In FIG. 13, a flowchart shows a method according to an example embodiment. The method involves measuring 1300 gain values used by a VGA to read servo marks of a heat-assisted recording medium. Based on the gain values, sector-specific, repeatable gain values are determined 1301 that indicate an expected VGA gain at a desired clearance. The sector-specific, repeatable gain values are used 1302 as input to a closed-loop clearance controller together with measured values of servo VGA gain while writing data to the recording medium.

Figure 14:
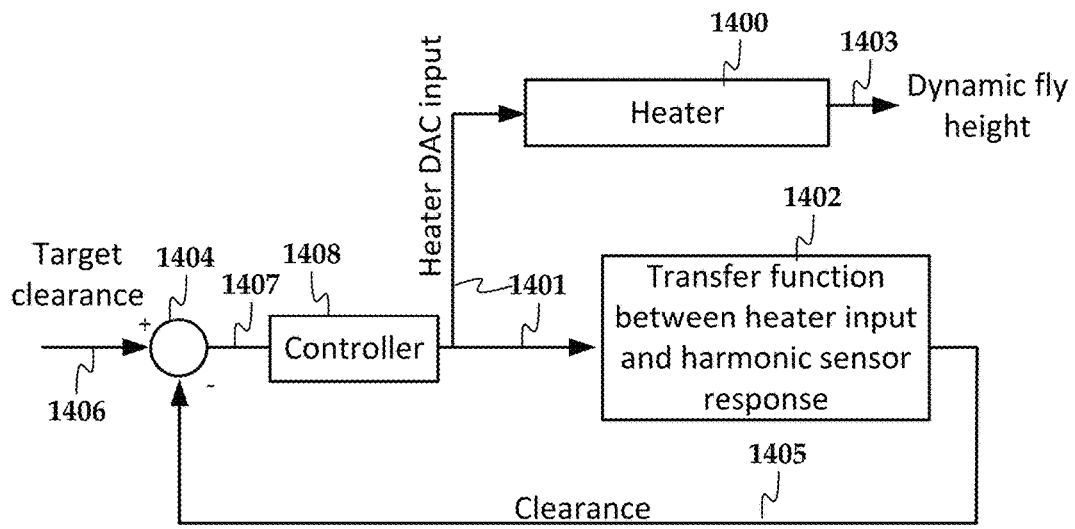
FIGS. 14 and 15 are control diagrams of closed-loop fly-height controllers according to other example embodiments.

As noted above, a harmonic sensor can be used instead of or together with VGA gain measurements to provide closed loop feedback for a clearance controller. In FIG. 14, a block diagram illustrates a high-level diagram of a control loop according to another example embodiment. A clearance-control heater 1400 receives an input 1401 via a DAC that causes changes to thermally-induced dynamic fly height 1403. The dynamic fly height 1403 affects the response of the harmonic sensor, which reads tones of different frequencies from two or more servo mark fields (see, e.g., FIG. 6).

As indicated by block 1402, a transfer function between the heater DAC input 1401 and a clearance 1405 determined from the harmonic sensor can be used as a controller plant to provide feedback to control the dynamic fly height 1403. A target clearance 1406 is input to summation block 1404, from which the measure clearance 1405 is subtracted. The difference 1407 is input to a controller 1408, which uses a transfer function to map clearance changes 1407 to the DAC input 1401.

Figure 15:
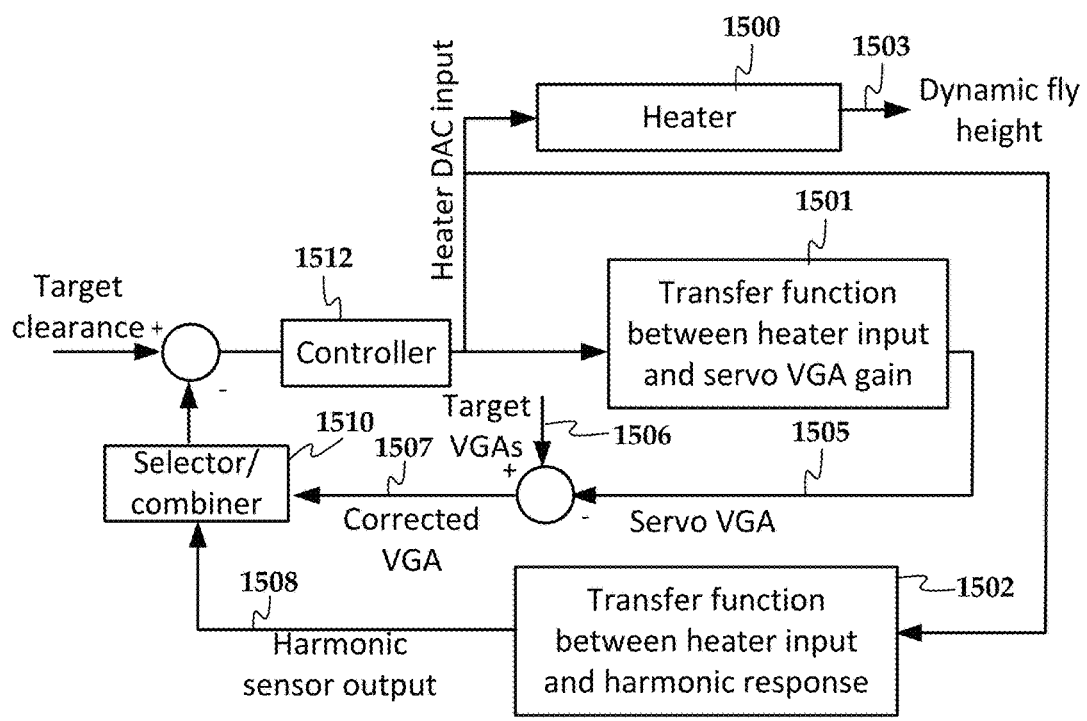

In FIG. 15, a block diagram illustrates a high-level diagram of a control loop according to another example embodiment. A clearance-control heater 1500 affects thermally-induced dynamic fly height 1503 as previously described. In this example, a first transfer function 1501 between heater DAC and servo VGA gain and a second transfer function 1502 between the heater DAC and harmonic sensor response are used. The servo VGA gain 1505 is modified by a target VGA 1506 as previously described. Both the corrected VGA 1507 and harmonic sensor output 1508 are processed by a selector/combiner block 1508. The selector combiner block 1508 may select just one of the feedback inputs 1507, 1508, e.g., based on availability, estimated error, etc. In other configurations, the selector combiner block 1508 may combine the signals 1507, 1508, e.g., convert them to a common system of units and average the signals. The output of the selector combiner block 1508, which in this case is shown as an estimate of clearance, can be used as previously described, e.g., subtracting from a target clearance and used by a controller 1512 which controls heater DAC inputs.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   measuring gain values used by a variable gain amplifier (VGA) to read servo marks of a magnetic recording medium;
   determining, from the gain values, sector-specific, repeatable gain values that indicate an expected VGA gain at a desired clearance; and
   using the sector-specific, repeatable gain values together with measured values of servo VGA gain as feedback to a closed-loop clearance controller while writing data to the recording medium.

2. The method of claim 1, further comprising cancelling a writing operation if the combination of the measured values of servo VGA gain and the sector-specific, repeatable gain values indicate head-to-media contact is imminent.

3. The method of claim 1, wherein the sector-specific, repeatable gain values are stored in one or more of the servo marks.

4. The method of claim 1, wherein the sector-specific, repeatable gain values are derived from a curve fit of the measured values, parameters of the curve fit being stored on the recording medium.

5. The method of claim 4, wherein the curve fit estimates gain as a function of rotation angle, the method further comprising determining a track-specific offset that is derived from a second curve fit, the track-specific offset added to the estimated gain to derive the sector-specific repeatable gain values.

6. The method of claim 5, wherein the second curve fit is selected from a plurality of zone-specific curve fits.

7. The method of claim 1, further comprising using harmonic sensing signals as input to the closed-loop clearance controller, the harmonic sensing signals measured from two or more fields of the servo marks.

8. The method of claim 1, wherein the gain values are measured as part of a factory certification test.

9. The method of claim 1, wherein the gain values are measured during operation of a disk drive that includes the recording medium, the measurement triggered by a detected change in a read/write head that writes the data to the recording medium.

10. An apparatus, comprising:
    a variable gain amplifier (VGA) configured to adjust signal gain received from a magnetic read transducer; and
    a controller coupled to the VGA and configured to use sector-specific, repeatable gain values of servo marks together with measured values of servo VGA gain as feedback to a closed-loop clearance controller while writing data to a recording medium, the sector-specific, repeatable gain values indicating an expected VGA gain at a desired clearance.

11. The apparatus of claim 10, wherein the controller is further configured to measure the sector-specific, repeatable gain values the servo marks of the recording medium in a factory certification test.

12. The apparatus of claim 10, wherein the controller is further configured to cancel a writing operation if the combination of the measured values of servo VGA gain and the sector-specific, repeatable gain values indicate head-to-media contact is imminent.

13. The apparatus of claim 10, wherein the sector-specific, repeatable gain values are stored in one or more of the servo marks.

14. The apparatus of claim 10, wherein the sector-specific, repeatable gain values are derived from a curve fit, parameters of the curve fit being stored on the recording medium, wherein the curve fit estimates gain as a function of rotation angle, the controller further configured to determine a track-specific offset that is derived from a second curve fit, the track-specific offset added to the gain to derive the sector-specific repeatable gain values.

15. A method comprising:
   during qualification testing of a magnetic recording disk drive, measuring gain values used by a variable gain amplifier (VGA) to read a plurality of servo marks of a recording medium;
   deriving one or more curve fits that estimate a sector-specific, target VGA gain for the servo marks; and
   during operation of the magnetic recording disk drive, using the one of more curve fits to modify a feedback input to a closed-loop clearance controller while writing data to the recording medium, the feedback input including servo VGA gain values measured while reading the servo marks.

16. The method of claim 15, further comprising cancelling a writing operation if the measured values of servo VGA gain and the target VGA gain indicate head-to-media contact is imminent.

17. The method of claim 15, wherein one of the curve fits estimates the target VGA gain as a function of rotation angle.

18. The method of claim 17, wherein a second of the curve fits estimates a track-specific offset, the track-specific offset added to the target VGA.

19. The method of claim 18, wherein the second curve fit is selected from a plurality of zone-specific curve fits.

20. The method of claim 15, further comprising:
   re-measuring the gain values during operation of a disk drive that includes the recording medium, the measurement triggered by a detected change in a read/write head that writes the data to the recording medium; and
   modifying the one or more curve fits based on the re-measuring of the gain.

* * * * *